United States Patent [19]

Ludman et al.

[11] Patent Number: 4,505,588

[45] Date of Patent: Mar. 19, 1985

[54] FIBER STELLAR INTERFEROMETER

[76] Inventors: Jacques E. Ludman, 98 Old Lowell Rd., Westford, 01886; John L. Sampson, 8 Bedford St., Lexington, 02173; Henry J. Caulfield, 385 Old Beaverbrook, Nagog Woods, all of Mass. 01718

[21] Appl. No.: 465,215

[22] Filed: Feb. 9, 1983

[51] Int. Cl.³ .............................................. G01B 9/02
[52] U.S. Cl. .................... 356/354; 250/227; 350/96.14
[58] Field of Search .............. 356/345, 346, 354, 355; 250/227; 350/96.14

[56] References Cited

U.S. PATENT DOCUMENTS

| | | | |
|---|---|---|---|
| 3,585,705 | 6/1971 | Allan | 29/412 |
| 4,089,586 | 5/1978 | French et al. | 350/96.30 |
| 4,120,587 | 10/1978 | Vali et al. | 356/106 |
| 4,133,612 | 1/1979 | Redman | 356/350 |
| 4,138,196 | 2/1979 | Redman | 356/350 |
| 4,147,979 | 4/1979 | Baues et al. | 324/244 |
| 4,248,535 | 2/1981 | Pircher | 356/350 |
| 4,259,016 | 3/1981 | Schiffner | 356/350 |
| 4,265,541 | 5/1981 | Leclerc et al. | 356/350 |
| 4,273,445 | 6/1981 | Thompson et al. | 356/350 |
| 4,302,107 | 11/1981 | Schiffner et al. | 356/350 |
| 4,325,636 | 4/1982 | Schiffner | 356/350 |
| 4,329,058 | 5/1982 | James et al. | 356/352 |

OTHER PUBLICATIONS

Born et al., *Principles of Optics*, Pergamon Press, 1970, pp. 275-271.
Leonberger, "High-Speed Operation of LiNbO₃ Electro-Optic Interferometric Waveguide Modulators", *Optics Letters*, vol. 5, No. 7, pp. 312-314, Jul. 1980.
DeCou, "Interferometric Star Tracking", *Applied Optics*, vol. 13, No. 2, pp. 414-424, Feb. 1974.
Iiyama et al., "Optical Field Mapping Using Single-Mode Optical Fibers", *Applied Optics* vol. 17, No. 12, pp. 1965-1971, Jun. 1978.

*Primary Examiner*—Davis L. Willis
*Assistant Examiner*—Matthew W. Koren
*Attorney, Agent, or Firm*—Donald J. Singer; Jacob N. Erlich

[57] ABSTRACT

A fiber stellar interferometer having a pair of adjustably movable focusing lenses, a pair of monomode optical fibers, a block of electro-optic material defining a pair of optical paths, means for controlling the effective path length of one of the optical paths and an intensity detector. Electromagnetic radiation emanating from a source, such as a star, is received at two separate locations by the focusing lenses which direct this electromagnetic radiation into two separate beams which are focused into each of the pair of monomode fibers, respectively. The monomode fibers direct these two beams into respective optical paths within the electro-optic block of material. The outputs from the two optical paths are combined and received by the intensity detector. Varying the effective path length of one of the optical paths alters the phase of the beam passing therethrough. As a consequence thereof the intensity of the output received by the detector varies accordingly. These varying intensities can be utilized to determine the size and shape of the source by conventional stellar intensity interferometer techniques.

10 Claims, 1 Drawing Figure

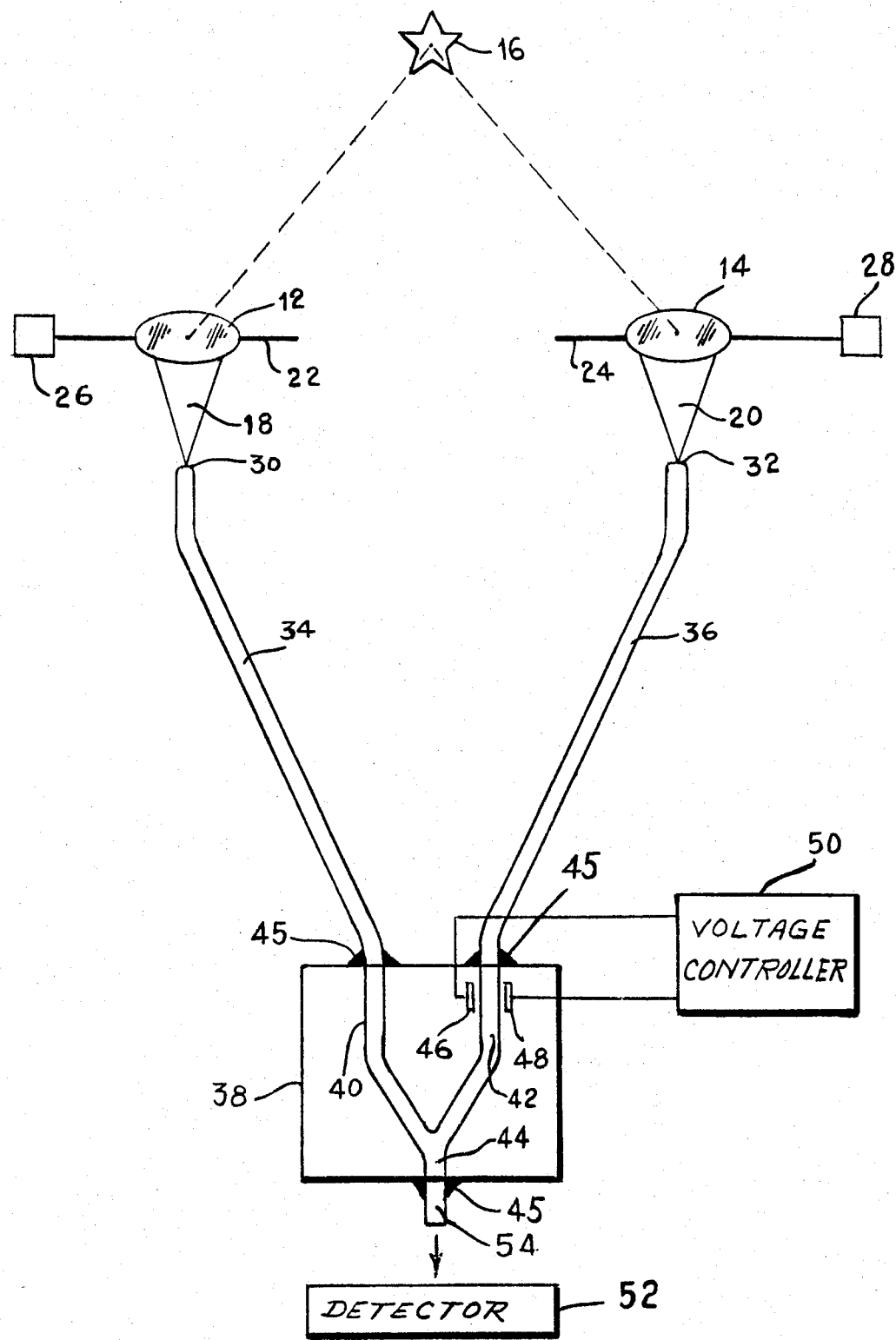

FIBER STELLAR INTERFEROMETER

STATEMENT OF GOVERNMENT INTEREST

The invention described herein may be manufactured and used by or for the Government for governmental purposes without the payment of any royalty thereon.

BACKGROUND OF THE INVENTION

This invention relates generally to large telescopes or stellar interferometers, and, more particularly, to a novel optical fiber stellar interferometer having high resolving power and greatly increased sensitivity.

There are many occassions when it becomes necessary to study objects located at great distances from an observer or observation station. For example, one such occassion arises with the study and investigation of the stellar system, that is the stars, planets and other satellites. In particular, even with the large telescopes in use today accurate size and shape determinations of stars are virtually impossible. In order to increase the capability of today's large telescopes, some of these telescopes have been modified to produce what is more commonly referred to as stellar interferometers.

In the conventional stellar interferometer, light is deflected from two separate points by means of plain mirrors and directed into the telescope so as to interfere, forming fringes. The fringes formed are similar to fringes formed by two slits. A point source leads to a system of fringes whose intensity difference reaches a maximum midway between the slits and falls off in either direction. A pair of sources leads to a superposition of two such patterns. The separation of the two fringe patterns depends upon the angular separation of the sources. The fringe period depends upon the distance between the slits. By varying this distance, the patterns may be made to intermesh to vary the fringe visibility (normalized difference between maximum and minimum intensities). Measurement of the variation of fringe visibility as a function of the plain mirror separation permits the accurate determination of the angular separation of the subject stars. The effective resolution of the telescope (1.22 $\lambda$/D) is increased since the factor D becomes the separation of the mirrors rather than the diameter of the telescope objective. The fringes are produced by the change in relative phase with position in the plane of the fringes.

With stellar interferometers in use today a problem generally results as a result of the low light level associated with these fringes. In addition, there is the problem of stellar interferometer instability due to the long path lengths and associated lack of mechanical rigidity. It would therefore be highly desirable to provide a stellar interferometer with the capability of providing information sufficient to make accurate size and shape determinations of, for example, stars.

SUMMARY OF THE INVENTION

The optical fiber stellar interferometer of the present invention although not limited to only enhancing stellar observations, overcomes the problems set forth hereinabove by providing an interferometer which is independent of the low light level associated with fringes of past stellar interferometers and therefore is capable of attaining a high resolving power and greatly increased sensitivity.

The optical fiber stellar interferometer of this invention includes a pair of adjustably movable focusing lenses or mirrors, a pair of monomode optical fibers of substantially the same length, an electro-optic block of material which defines therein a pair of optical paths of substantially equal length, means for varying the effective length of one of the optical paths within the electro-optic block of material, and a detector for detecting output intensity.

The pair of lenses or mirrors are utilized to receive electromagnetic radiation or, more specifically, light emanating from, for example, a star. The pair of lenses, are capable of adjustable movement with respect to each other in order to vary the distance therebetween for increased effectiveness. One of the lenses focuses one portion of electromagnetic radiation emanating from the source(s) into one of the monomode optical fibers. The other lens is located a preselected distance away from the one lens and focuses a different portion of the electromagnetic radiation emanating from the source(s) into the other monomode fiber, with the fibers having substantially equal length. The incoming electromagnetic radiation may be derived from a single source such as a single star, or from a pair of sources such as a pair of stars or a star and a planet. Thereafter, the incoming electromagnetic radiation is coupled as a first and second beam of electromagnetic radiation into the respective optical fibers at the above-mentioned focus points.

It is necessary with this invention to utilize monomode optical fibers, that is, fibers that can transmit only in one mode, so that the output of each of the fibers will represent an integration over phase of the input. In other words, the output of the monomode fiber is a wave of a single phase even though the phase of the incoming electromagnetic radiation may vary spatially.

Each monomode fiber is optically connected by optical couplers or the like to the ends of the pair of optical paths, respectively, formed within the electro-optic block of material. Consequently, each of the incoming beams travel paths of substantially equal length. A variable electric field is applied to one of the two optical paths in the electro-optic block of material in order to alter the effective path length of that particular path. In other words, the phase of one of the two waves of the two beams which pass through the electro-optical material is selectively retarded prior to recombining with the other beam within the electro-optic material. The two waves may recombine constructively or destructively, depending upon the relative phases in order to emit a large or small signal at the detector which receives the output of the recombined waves of electromagnetic radiation.

Because the phases of the two beams of electromagnetic radiation emanating from the source, such as a star, are phase-retarded by different amounts by the altering of the path lengths, the intensity variations based on either a constructive or destructive interference can be received by the intensity detector. This collected intensity can be analyzed by conventional stellar intensity interferometer techniques such as described in "Principles of Optics", Born and Wolf, Pergamon Press, 1970, pp 275–277 and which is incorporated herein by reference in order to determine the size and shape of the source. Stated more succinctly, the visibility of the fringes is measured as a function of lens separation to determine the angular dimensions of the source(s).

Since collected intensity is utilized with this invention, the entire signal is received by the detector rather than being spread over the area for examination of the fringes. This results in a substantially greater sensitivity than possible with prior art stellar interferometers. In addition, the electronic method of varying the effective length of one of the optical paths, and, therefore the phase, is extremely fast. Slow atmospheric variations, therefore, present only minimal problems.

It is therefore an object of this invention to provide an optical fiber stellar interferometer which has a high resolving power.

It is still another object of this invention to provide an optical fiber stellar interferometer which has greatly increased sensitivity.

It is still another object of this invention to provide an optical fiber stellar interferometer which substantially eliminates any problems of low light level associated with fringes.

It is still a further object of this invention to provide an optical fiber stellar interferometer which overcomes the problems of past interferometer instability.

It is still a further object of this invention to provide an optical fiber stellar interferometer which is economical to produce and which utilizes conventional, currently available components that lend themselves to standard mass producing manufacturing techniques.

For a better understanding of the present invention, together with other and further objects thereof, reference is made to the following description taken in conjunction with the accompanying drawing and its scope will be pointed out in the appended claims.

DETAILED DESCRIPTION OF THE DRAWING

The only FIGURE of the drawing is a schematic representation of the optical fiber stellar interferometer of this invention.

DETAILED DESCRIPTION OF THE PREFERRED EMBODIMENT

Reference is now made to the only FIGURE of the drawing which illustrates schematically the fiber stellar interferometer 10 of this invention. It should be noted that although the fiber stellar interferometer 10 of the present invention finds its major utility in astronomical applications, such as, for example, determining the size and shape of stars, this invention is not limited thereto and is operable in providing the size and shape of any number of objects subtending very small angles due to either their very great distance or small size.

The optical stellar interferometer 10 of this invention is made up of a plurality of interrelated optical components. More specifically, a pair of spaced apart lenses or mirrors 12 and 14, respectively, are utilized to direct and focus different portions of the electromagnetic radiation (light) emanating from a source 16 such as a star into a pair of separate beams 18 and 20 of electromagnetic radiation. Although the only FIGURE of the drawing illustrates a single source 16, it should be realized that interferometer 10 is also operational with a pair of sources such as a pair of stars or a star and a planet. In any case, however, in making size and shape determinations of source 16, beams 18 and 20 must be focused from distinct or physically separated portions of the radiation emanating from source(s) 16.

To accomplish this physical separation, lenses or mirrors 12 and 14 are each movably and adjustably mounted upon any suitable, conventional guide frames 22 and 24, respectively, in a conventional manner. Actual movement of the lenses may be performed by the use of conventional mechanical means and/or electrical drive motors illustrated schematically as elements 26 and 28.

Lenses or mirrors 12 and 14 are utilized to focus the electromagnetic radiation from source 16 into beams 18 and 20 which focus on the ends 30 and 32 of a pair of monomode optical fibers 34 and 36, rspectively. An example of such a monomode optical fiber is set forth in U.S. Pat. No. 4,089,586 issued on May 16, 1978. The present invention incorporates monomode fibers 34 and 36 therein since it is essential to pass only a single mode of electromagnetic radiation therethrough. The length of each of the monomode optical fibers 20 and 22 is also made substantially equal to the other.

Situated adjacent optical fibers 34 and 36 is a block 38 of electro-optic material such as lithium niobate in which is formed a pair of optical paths 40 and 42 of substantially the same length. Optical paths 40 and 42 are formed by means of any suitable diffusion technique and combine to form a single optical path 44 thereby forming an overall Y-shaped configuration. The Y-shape provides first optical path 40, second optical path 42, with these optical paths 40 and 42 combining into optical path 44. One end of each optical path 40 and 42 has coupled thereto by any suitable coupling means such as optical couplers or an adhesive such as epoxy 45, a respective output end of independent monomode optical fibers 34 and 36, respectively.

Operably associated with one of the paths (designated as optical path 42 in the drawing) is a means for applying a variable electric field thereto in order to alter the effective optical path length of that particular optical path 42. Such an effective length altering means may take the form of a pair of electrodes 46 and 48 positioned adjacent optical path 42. Electrodes 46 and 48 are electrically connected to any suitable, conventional, variable, controllable voltage source 50.

In addition, any suitable intensity detector 52 such as a photo cell or intensity cell is optically aligned with the output end of the optical path 44 formed within electro-optic block of material 38. For optimum results with the interferometer 10 of this invention any conventional optical fiber 54 may be coupled by, for example, epoxy 45 to the end of optical path 44 so as to direct the output therefrom directly into intensity detector 52.

MODE OF OPERATION OF THE PREFERRED EMBODIMENT

During operation of the optical fiber stellar interferometer 10 of this invention, an electromagnetic radiation source 16 such as a star produces light which is received at different locations by the pair of focusing lenses or mirrors 12 and 14. The exact location at which the light is received is determined by the positioning of lenses 12 and 14 along guide frames 22 and 24. The focusing lenses 12 and 14 direct this electromagnetic radiation in the form of beams 18 and 20 directly onto the ends 30 and 32 of respective optical fibers 34 and 36. The electromagnetic radiation from beams 20 and 22 are thereby coupled directly into the respective ends of fibers 34 and 36.

The phase of the electromagnetic radiation collected from source 16.may vary spatially. Monomode optical fibers 34 and 36, however, are capable of transmitting in only one mode, and, therefore, the output from each fiber 34 and 36 entering optical paths 40 and 42, respectively, within electro-optic block of material 12 represents an integration over phase of the input, that is, a wave of only a single phase. In other words, no spatial information appears in the output of monomode optical fibers 34 and 36.

The outputs from optical fibers 34 and 36 are compared by selectively retarding the phase of one of the two waves and then recombining the waves. This is accomplished by providing the pair of electrodes 46 and 48, adjacent one of the optical paths 42 within the electro-optic block of material 38, electrically connected to a variable voltage controller 50 in order to selectively control the voltage between electrodes 46 and 48. By controlling the voltage between electrodes 46 and 48, the effective length of optical path 42 may be varied accordingly, thereby selectively retarding the phase of the wave of electromagnetic radiation passing through optical path 42 with respect to the wave passing through optical path 40. Thereafter, the two waves passing through paths 40 and 42 recombine constructively or destructively in optical path 44, depending upon the relative phases of the two waves. The resultant output intensity passed through optical fiber 48 to detector 52 would therefore either be a large or small signal received by detector 52 in accordance with either a constructive or destructive recombining of the waves.

Because the phases of the two independent beams 18 and 20 of electromagnetic radiation are phase-retarded by different amounts in the manner indicated above, the intensity variations received by detector 52 can be readily analyzed by conventional stellar intensity interferometer techniques such as described in "Principles of Optics" by Born and Wolf mentioned hereinabove and which incorporated herein by reference. The entire signal is received by detector 52 rather than being spread over an area for examination of fringes as with past spectrometers. Consequently, the sensitivity achieved by this invention is substantially greater than with prior art devices. In addition, the electronic procedure for varying the effective path lengths and therefore the phase of one of the beams reduces the effect of slow atmospheric variations.

Although the invention has been described with reference to a particular embodiment, it will be understood that this invention is also capable of further and other embodiments within the spirit and scope of the appended claims.

We claim:

1. An optical fiber stellar interferometer comprising:
   means for receiving an output of electromagnetic radiation emanating from a source, said receiving means focusing electromagnetic radiation derived from one location in said electromagnetic radiation into a first beam of electromagnetic radiation focused to a first preselected point and focusing electromagnetic radiation derived from another location in said electromagnetic radiation into a second beam of electromagnetic radiation focused to a second preselected point;
   means optically aligned with said first beam and said second beam of electromagnetic radiation for receiving said first and said second beams of electromagnetic radiation and passing therethrough only a single mode from each of said beams of electromagnetic radiation;
   means optically aligned with said single mode passing means for defining a first beam path and second beam path and for combining said first and second beam paths into a single output beam path whereby said first beam of electromagnetic radiation having only a single mode follows said first beam path and said second beam of electromagnetic radiation having only a single mode follows said second beam path prior to combining into a single output beam of electromagnetic radiation following said output beam path;
   means operably associated with only one of said first or said second beam paths for altering the phase of said beam of electromagnetic radiation following said one beam path prior to said first and second beams combining into said single output beam following said output beam path; and
   means optically aligned with said output beam path of said beam path defining means for receiving said single output beam and detecting varying intensities of said single output beam of electromagnetic radiation whereby said varying intensities can be utilized to determine the size and shape of said source of electromagnetic radiation by stellar intensity interferometer techniques.

2. An optical fiber stellar interferometer as defined in claim 1 wherein said single mode passing means comprises a first monomode optical fiber optically interposed between said first preselected focus point and said first beam path and a second monomode optical fiber optically interposed between said second focus point and said second beam path.

3. An optical fiber stellar interferometer as defined in claim 2 wherein said path defining means comprises a block of electro-optic material having said first, said second and said output beam paths formed therein.

4. An optical fiber stellar interferometer as defined in claim 3 wherein said first monomode optical fiber and said second monomode optical fibers are of substantially equal length.

5. An optical fiber stellar interferometer as defined in claim 4 wherein said focusing means comprises a pair of focusing lenses, said lenses being positioned in a spaced apart preselected relationship from each other.

6. An optical fiber stellar interferometer as defined in claim 5 further comprising means operably connected to said pair of focusing lenses for adjustably mounting said lenses for controlled movement to said spaced apart positions.

7. An optical fiber stellar interferometer as defined in claim 6 wherein said first beam path and said second beam path are of substantially equal length.

8. An optical fiber stellar interferometer as defined in claim 7 wherein said beam phase altering means comprises means for altering the effective length of said one beam path.

9. An optical fiber stellar interferometer as defined in claim 8 wherein said effective path length altering means comprises a pair of electrodes adjacent said one beam path and means electrically connected to said pair of electrodes for providing a controlled voltage to said electrodes.

10. An optical fiber stellar interferometer as defined in claim 9 wherein said intensity receiving and detecting means comprises a photocell.

* * * * *